(No Model.)

A. C. G. DUPUIS.
VEHICLE AXLE.

No. 595,469. Patented Dec. 14, 1897.

WITNESSES:
L. S. Elliott,
D. L. Rice.

INVENTOR:
A. C. G. Dupuis
by Eugene W. Johnson
his attorney

UNITED STATES PATENT OFFICE.

ADOLPHE CHARLES GHISLAIN DUPUIS, OF NEW ORLEANS, LOUISIANA.

VEHICLE-AXLE.

SPECIFICATION forming part of Letters Patent No. 595,469, dated December 14, 1897.

Application filed July 8, 1896. Serial No. 598,442. (No model.)

*To all whom it may concern:*

Be it known that I, ADOLPHE CHARLES GHISLAIN DUPUIS, a subject of the King of Belgium, (having declared my intention to become a citizen of the United States,) residing at New Orleans, State of Louisiana, have invented a new and useful Axle, of which the following is a specification.

My invention relates to improvements in axles for vehicles, the object being to provide an axle of improved construction which is adapted to receive an axle-box and means for retaining said box upon the spindle.

The invention consists in an improved axle which is provided with a recess and collar and beyond said collar with a portion which is shaped otherwise than round, said axle being adapted to receive a two-part nut which is held thereon by a threaded cap, the parts being connected to each other and to the axle, as will be hereinafter fully set forth.

Figure 1:
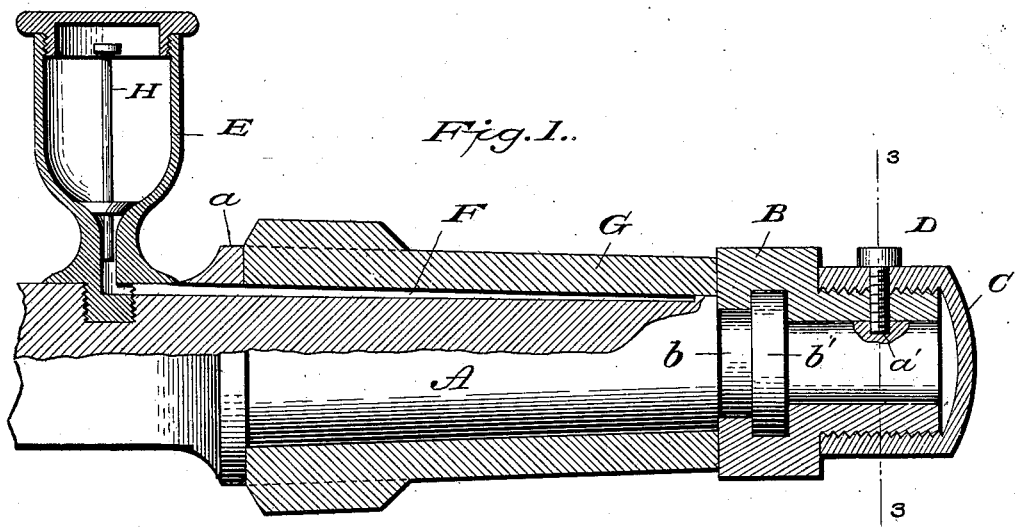
Figure 2:
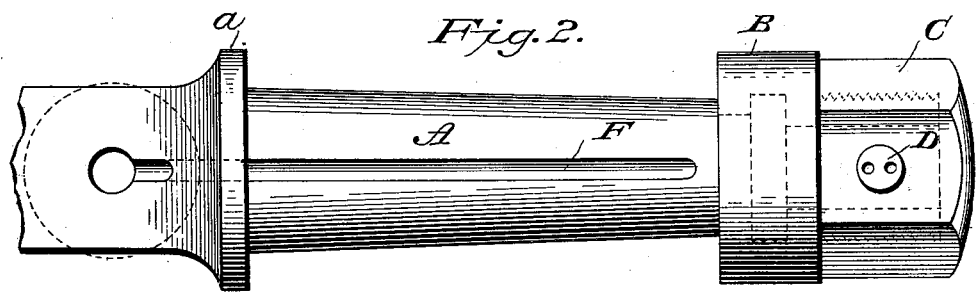
Figure 3:
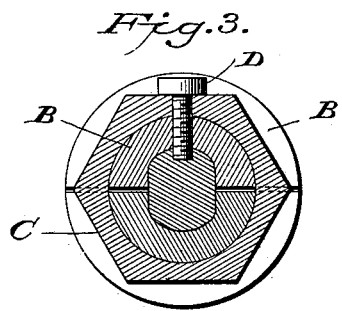

In the accompanying drawings, Figure 1 is a longitudinal sectional view of an axle constructed in accordance with my invention. Fig. 2 is a plan view, and Fig. 3 is a vertical sectional view taken on the dotted lines 3 3 of Fig. 1.

A refers to the wagon or vehicle axle, the same having a collar or flange against which the axle-box G will abut, said box being comparatively short compared with those in ordinary use. The axle is provided with a collar $a$ and an oil-channel F, which passes through the collar $a$. The channel F is connected to a suitable oil-cup E, having a valve-stem H, with a valve which is seated in the bottom of the oil-cup, said valve being adapted to remain upon the seat when the vehicle is at rest, and when the vehicle is in motion the valve-stem will vibrate or be moved from its seat sufficient to permit oil to pass from the oil-cup to the way or channel F. At a slight distance beyond the way or channel F the axle is provided with a groove or recess $b$ and beyond said groove or recess with a flange or collar $b'$. The end of the axle beyond the collar is shaped so as to be otherwise than round or cylindrical, the configuration being preferably as shown in cross-section in Fig. 3. The reduced outer end of the axle A is provided with a recess $a'$, with which engages a set-screw, as will be hereinafter set forth.

B refers to a divided nut or washer which is made up of two parts shaped to correspond internally with the external configuration of the end of the axle, and the same has a reduced portion which is threaded to receive a cap-nut C, which nut, as well as the nut or washer B, is provided with internally-threaded recesses which register with the recess $a'$ in the axle, and said recesses are adapted to receive a lock-bolt D.

In assembling the parts the axle-box is placed upon the spindle, one end abutting against the collar, while the other end abuts against the two-part or divided nut or washer, the inwardly-projecting flange of which engages with a recess $b$. The parts of the divided nut or washer are held together by the cap-nut C, and said nut is locked by the set-screw D, the lower end of which enters the recess $a'$.

I am aware that prior to my invention it was not broadly new to provide a wagon-axle with a longitudinal lubricating-channel one end of which is connected with an oil-cup, and I do not claim such construction, broadly, as my invention, as my improvement may be used to advantage with wagon-axles having other means of lubricating the spindle and box from that herein shown.

Having thus described my invention, what I claim as new, and desire to secure by Letters Patent, is—

1. In combination with the axle-spindle of a divided nut or washer which is adapted to embrace and be retained upon the end of the spindle by means of a cap-nut having internal threads, for engagement with external threads on the divided nut or washer, and a set-screw or locking-bolt which passes through the aforesaid parts and engages with the reduced end of the spindle substantially as shown.

2. In combination with the axle spindle and box, the spindle having a recess $b$, collar $b'$ and portion with flattened sides located beyond the collar $b'$, of a divided nut or washer B shaped to correspond internally with the external configuration of the end of the spindle, the outer ends of the divided nut or washer being threaded; together with a nut C, and means for holding the nut C, against rotation upon the nut or washer B, substantially as shown and for the purpose set forth.

ADOLPHE CHARLES GHISLAIN DUPUIS.

Witnesses:
VICTOR HUET,
W. B. BARNETT.